United States Patent [19]
Chatterji et al.

[11] Patent Number: 6,063,738
[45] Date of Patent: May 16, 2000

[54] FOAMED WELL CEMENT SLURRIES, ADDITIVES AND METHODS

[75] Inventors: Jiten Chatterji, Duncan; Roger S. Cromwell, Walters; Frank Zamora; Bobby J. King, both of Duncan, all of Okla.

[73] Assignee: Halliburton Energy Services, Inc., Duncan, Okla.

[21] Appl. No.: 09/294,234

[22] Filed: Apr. 19, 1999

[51] Int. Cl.[7] .............................. C09K 3/00; E21B 33/13; C04B 5/00

[52] U.S. Cl. ......................... 507/269; 507/202; 507/245; 507/254; 507/261; 166/293; 106/790; 106/678; 106/603; 516/14; 516/77; 516/912

[58] Field of Search ..................................... 507/269, 202, 507/254, 261, 245; 166/293; 106/790, 678, 603; 516/14, 77, 912

[56] References Cited

U.S. PATENT DOCUMENTS

| | | |
|---|---|---|
| 3,422,011 | 1/1969 | Jackovitz .................................. 516/14 |
| 3,926,650 | 12/1975 | Lange et al. ............................... 106/90 |
| 4,486,195 | 12/1984 | Weinstein .................................. 516/14 |
| 4,676,835 | 6/1987 | Green et al. ............................... 516/14 |
| 5,133,409 | 7/1992 | Bour et al. ............................... 166/293 |
| 5,147,565 | 9/1992 | Bour et al. ........................... 252/8.551 |
| 5,240,639 | 8/1993 | Diez et al. ................................ 516/14 |
| 5,569,324 | 10/1996 | Totten et al. ............................. 106/696 |
| 5,580,378 | 12/1996 | Shulman ................................. 106/677 |
| 5,588,489 | 12/1996 | Chatterji et al. ......................... 166/293 |
| 5,686,024 | 11/1997 | Dahanayake et al. ..................... 516/14 |
| 5,696,059 | 12/1997 | Onan et al. ............................. 507/269 |
| 5,711,801 | 1/1998 | Chatterji et al. ......................... 106/789 |

*Primary Examiner*—Philip Tucker
*Attorney, Agent, or Firm*—Craig W. Roddy; C. Clark Dougherty, Jr.

[57] ABSTRACT

The present invention provides improved foamed well cement slurries, additives and methods. The additives, which foam and stabilize a cement slurry containing fresh water or salt water, are basically comprised of a mixture of an ethoxylated alcohol ether sulfate surfactant, an alkyl or alkene amidopropyl betaine surfactant and an alkyl or alkene amidopropyl dimethyl amine oxide surfactant.

25 Claims, 3 Drawing Sheets

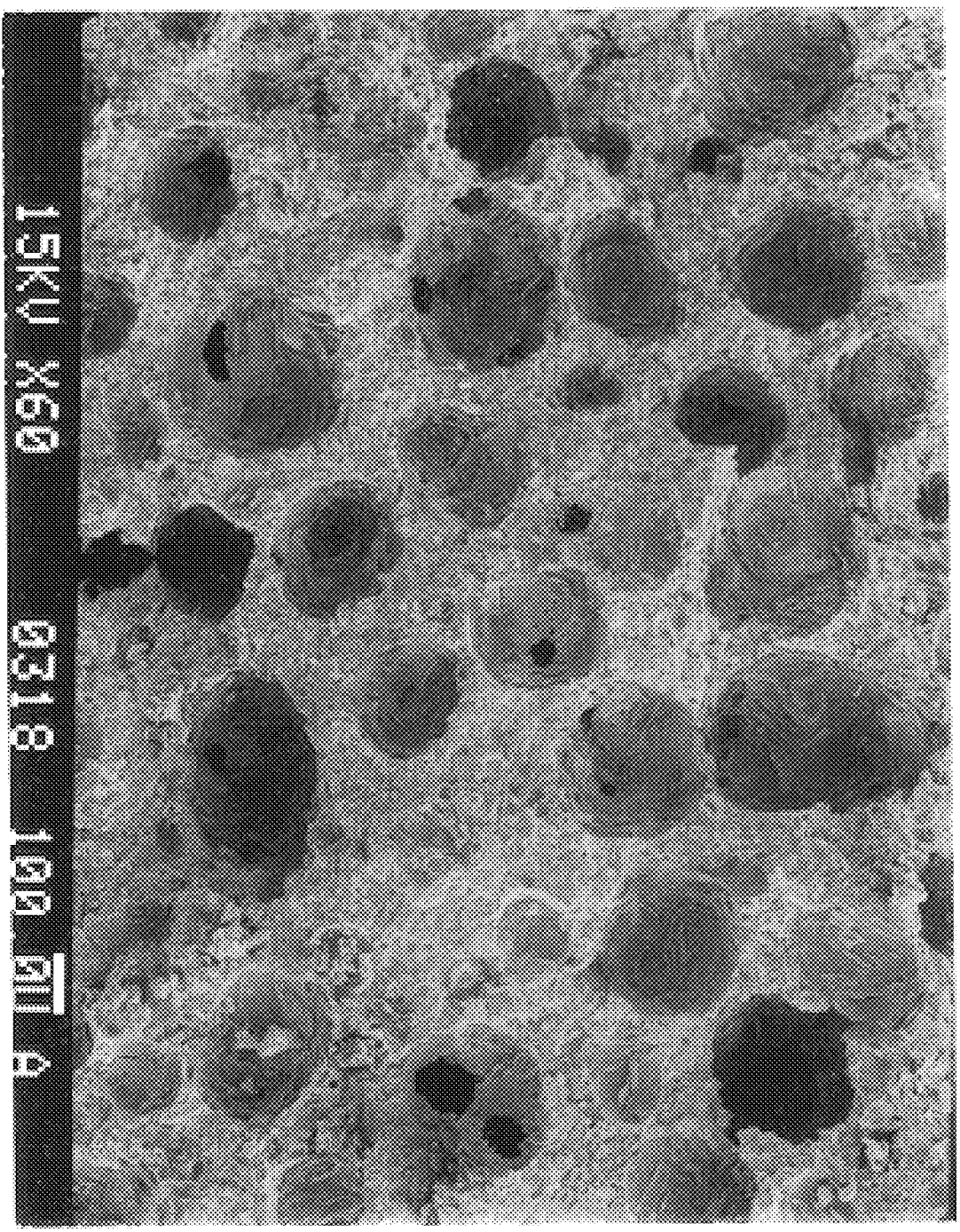

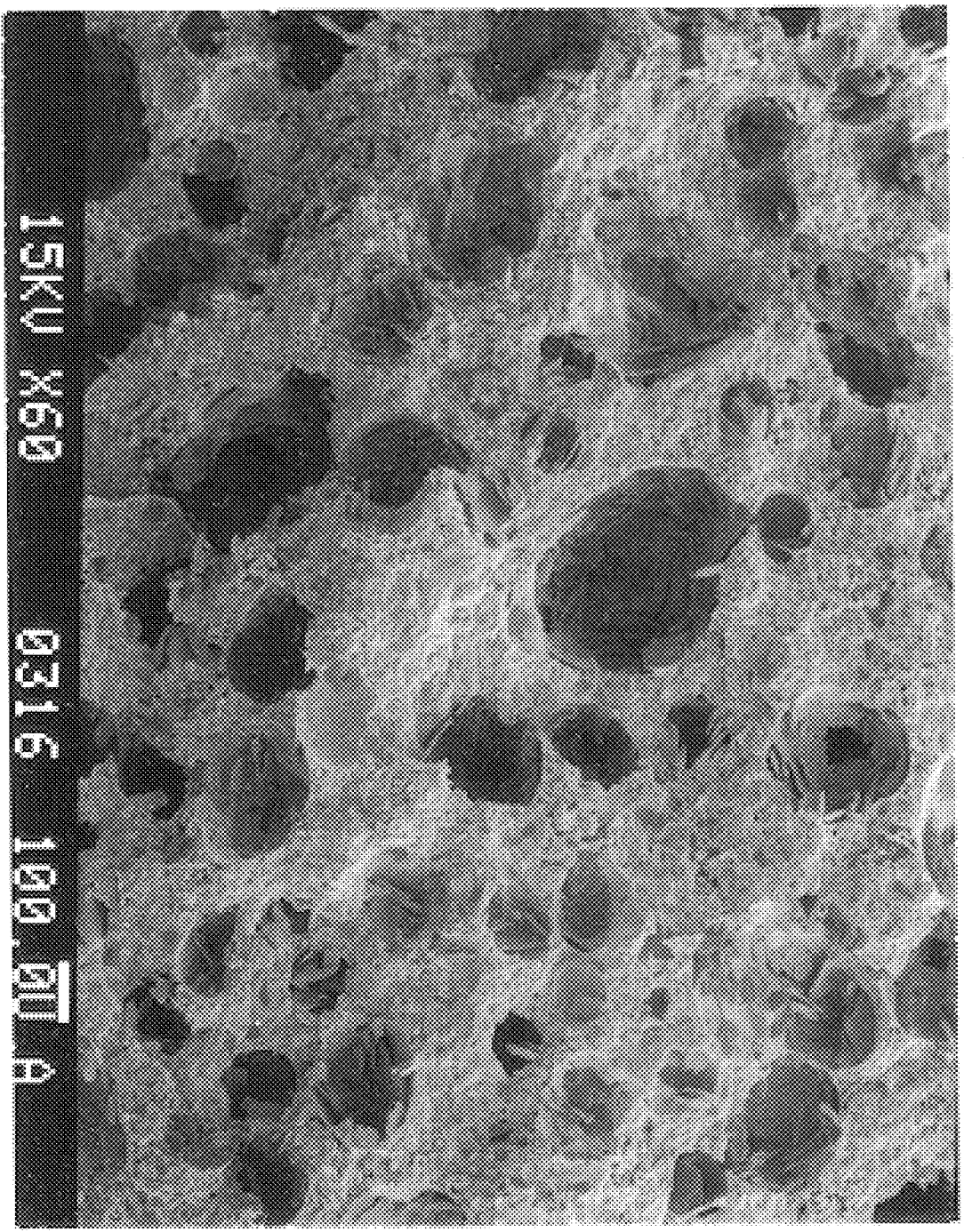
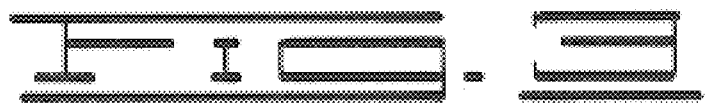

FOAMED WELL CEMENT SLURRIES, ADDITIVES AND METHODS

BACKGROUND OF THE INVENTION

1. Field of the Invention

The present invention relates to foamed well cement slurries, additives for foaming and stabilizing the foamed cement slurries and methods of using the slurries.

2. Description of the Prior Art

Hydraulic cement slurries are commonly utilized in subterranean well completion and remedial operations. For example, hydraulic cement slurries are used in primary cementing operations whereby strings of pipe such as casings and liners are cemented in well bores. In performing primary cementing, a hydraulic cement slurry is pumped into the annular space between the walls of a well bore and the exterior surfaces of a pipe string disposed therein. The cement slurry is permitted to set in the annular space thereby forming an annular sheath of hardened substantially impermeable cement therein. The cement sheath physically supports and positions the pipe in the well bore and bonds the exterior surfaces of the pipe to the walls of the well bore whereby the undesirable migration of fluids between zones or formations penetrated by the well bore is prevented.

In carrying out primary cementing as well as remedial cementing operations in well bores, the cement slurries utilized must often be light weight to prevent excessive hydrostatic pressure from being exerted on subterranean formations penetrated by the well bore. As a result, a variety of light weight cement slurries have heretofore been developed and used including foamed cement slurries.

In addition to being light weight, a foamed cement slurry contains compressed gas which improves the ability of the slurry to maintain pressure and prevent the flow of formation fluids into and through the slurry during its transition time, i.e., the time during which the cement slurry changes from a true fluid to a hard set mass. Foamed cement slurries are also advantageous because they have low fluid loss properties.

While the heretofore used foamed cement slurries have included various surfactants known as foaming agents for facilitating the foaming of cement slurries when a gas is mixed therewith and various other surfactants known as foam stabilizers for preventing the foamed cement slurries from prematurely separating into their slurry and gas components, various problems in the use of such surfactants have been experienced.

For example, when saltwater is utilized for forming a cement slurry and the saltwater contains salt in an amount above about 18% by weight up to the saturation amount, it has often heretofore been necessary to utilize a particular foaming agent and a particular foam stabilizer in order to produce a foamed cement slurry having a relatively short set time. For example, U.S. Pat. No. 5,147,565 issued to Bour et al. on Sep. 15, 1992 discloses foamed hydraulic cement slurries containing saltwater, a foaming agent consisting of a surfactant of the formula R—(OR')$_n$—OSO$_3$—X$^+$ and a separate foam stabilizer such as a glycol of the formula CH$_3$O—(CH$_2$CH$_2$O)$_n$H or a betaine surfactant. While the foamed cement slurries described in the patent are suitable for carrying out operations in salt containing subterranean formations and are relatively quick setting, the presence of the above described foaming agent and foam stabilizer in the foamed cement slurries lowers the compressive strengths of the slurries after they set.

More recently, an improved single universal additive for foaming and stabilizing a cement slurry containing fresh water or saltwater has been developed and used and is the subject matter of my co-pending patent application Ser. No. 08/899,043 filed on Jul. 23, 1997 now U.S. Pat. No. 5,897, 699. The additive for forming and stabilizing a cement slurry described and claimed therein is comprised of about 2 parts by weight of an alpha-olefinic sulfonate surfactant having the formula

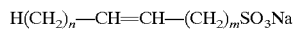
$$H(CH_2)_n\text{—}CH\text{=}CH\text{—}(CH_2)_m SO_3 Na$$

wherein n and m are individually integers in the range of from about 6 to 16, and about 1 part by weight of a betaine surfactant having the formula

$$R\text{—}CONHCH_2CH_2CH_2N^+(CH3)_2CH_2CO_2^-$$

wherein R is a radical selected from the group of decyl, cetyl, oleyl, lauryl and cocoyl.

While the above described additive is effective in foaming and stabilizing cement slurries, there is a continuing need for improved universal foaming and stabilizing additives for cement slurries which are effective in well cement compositions containing various types of cement and water and which form very stable foamed cement slurries at low concentrations.

SUMMARY OF THE INVENTION

The present invention provides improved foamed well cement slurries, improved additives for foaming and stabilizing the cement slurries and methods of using the cement slurries which meet the needs described above and overcome the deficiencies of the prior art. The improved foamed cement slurries are basically comprised of a hydraulic cement, sufficient water to form a pumpable slurry, sufficient gas to form a foam and an effective amount of a single additive for foaming and stabilizing the slurry comprised of an ethoxylated alcohol ether sulfate surfactant of the formula

$$H(CH_2)_a(OC_2H_4)_b OSO_3 NH_4^+$$

wherein a is an integer in the range of from about 6 to about 10 and b is an integer in the range of from about 3 to about 10 and the surfactant is present in the additive in an amount in the range of from about 60 to about 64 parts by weight, an alkyl or alkene amidopropyl betaine surfactant having the formula

$$R\text{—}CONHCH_2CH_2CH_2N^+(CH_3)_2CH_2CO_2^-$$

wherein R is a radical selected from the group of decyl, cocoyl, lauryl, cetyl and oleyl and the surfactant is present in the additive in an amount in the range of from about 30 to about 33 parts by weight and an alkyl or alkene amidopropyl dimethyl amine oxide surfactant having the formula

$$R\text{—}CONHCH_2CH_2CH_2N^+(CH_3)_2O^-$$

wherein R is a radical selected from the group of decyl, cocoyl, lauryl, cetyl and oleyl and the surfactant is present in the additive in an amount in the range of from about 3 to about 10 parts by weight.

The improved additive of this invention for foaming and stabilizing a cement slurry is a single additive which can be utilized with cement slurries containing fresh water or saltwater as well as a variety of other components. The additive basically comprises about 63.3 parts by weight of the above described ethoxylated alcohol ether sulfate surfactant, 31.7 parts by weight of the above described alkyl or alkene amidopropyl betaine surfactant and about 5 parts by weight of the above described alkyl or alkene amidopropyl dimethyl amine oxide surfactant. Preferably, the additive is an aqueous solution of the above described surfactants which can be readily mixed with a cement slurry.

The methods of the present invention comprise the steps of forming a foamed cement slurry of the present invention comprised of hydraulic cement, sufficient water to form a pumpable slurry, sufficient gas to form a foam and an affective amount of the above described additive for foaming and stabilizing the cement slurry, placing the foamed cement slurry into a subterranean zone by way of a well bore penetrating the zone and then allowing the foamed cement slurry to set into a hard impermeable mass therein.

It is, therefore, a general object of the present invention to provide improved foamed well cement slurries, additives and methods.

Other and further objects, features and advantages of the present invention will be readily apparent to those skilled in the art upon a reading of the description of preferred embodiments which follows.

BRIEF DESCRIPTION OF THE DRAWINGS

FIG. 1 shows a foamed cement slurry of the present invention.

FIGS. 2 and 3 show foamed cement slurries of the prior art.

DESCRIPTION OF PREFERRED EMBODIMENTS

Figure 2:
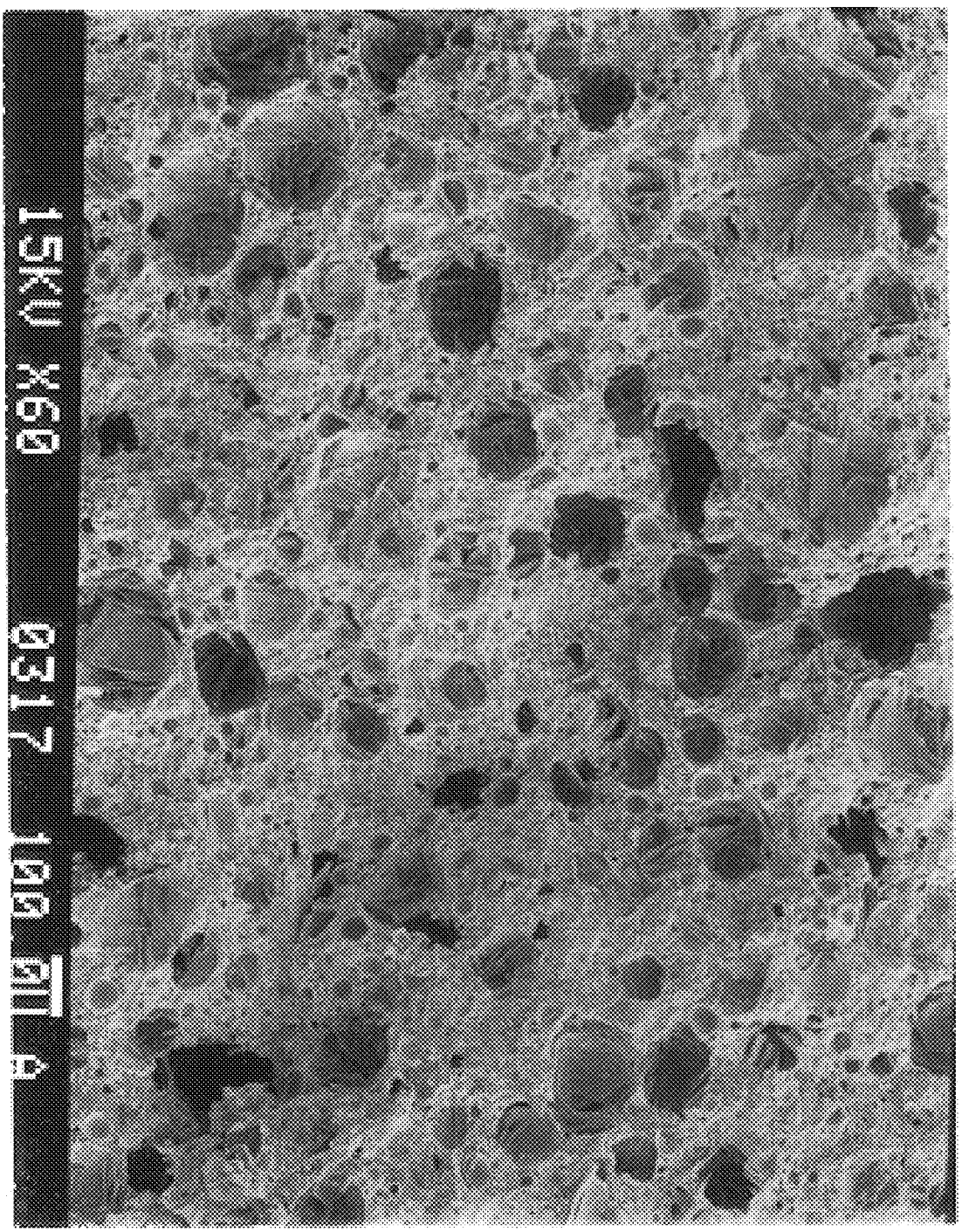

The improved foamed cement slurries of this invention are useful for performing a variety of completion and remedial procedures in subterranean formations. The foamed cement slurries are basically comprised of a hydraulic cement, sufficient water to form a pumpable slurry, sufficient gas to form a foam and an effective amount of the improved additive of this invention for foaming and stabilizing the slurry comprised of an ethoxylated alcohol ether sulfate surfactant of the formula $$H(CH_2)_a(OC_2H_4)_bOSO_3NH_4^+$$

wherein a is an integer in the range of from about 6 to about 10 and b is an integer in the range of from about 3 to about 10 and the surfactant is present in the additive in an amount in the range of from about 60 to about 64 parts by weight, an alkyl or alkene amidopropyl betaine surfactant having the formula $$R\text{—}CONHCH_2CH_2CH_2N^+(CH_3)_2CH_2CO_2^-$$

wherein R is a radical selected from the group of decyl, cocoyl, lauryl, cetyl and oleyl and the surfactant is present in the additive in an amount in the range of from about 30 to about 33 parts by weight and an alkyl or alkene amidopropyl dimethyl amine oxide surfactant having the formula $$R\text{—}CONHCH_2CH_2CH_2N^+(CH_3)_2O^-$$

wherein R is a radical selected from the group of decyl, cocoyl, lauryl, cetyl and oleyl and the surfactant is present in the additive in an amount in the range of from about 3 to about 10 parts by weight.

A variety of hydraulic cements can be utilized in accordance with the present invention including those comprised of calcium, aluminum, silicon, oxygen and/or sulphur which set and harden by reaction with water. Such hydraulic cements include Portland cements, pozzolana cements, gypsum cements, high aluminum content cements, silica cements, high alkalinity cements and slag cements. The cements can be of conventional particle sizes or they can be of ultra-fine particle sizes. Portland cements are generally preferred for use in accordance with this invention. Portland cements of the types defined and described in API Specification for Materials and Testing for Well Cement, *API Specification* 10, 5th Edition, dated Jul. 1, 1990 of the American Petroleum Institute are particularly suitable. Preferred such API Portland cements include classes A, B, C, G and H, with API classes G and H being more preferred and class G being the most preferred.

The water in the cement slurries can be fresh water or saltwater. The term "saltwater" is used herein to mean unsaturated salt solutions and saturated salt solutions including brines and seawater. The water is generally present in the cement slurries in an amount in the range of from about 38% to about 56% by weight of cement in the slurries.

The gas utilized for forming the foamed cement slurries of this invention can be air or nitrogen, with nitrogen being preferred. The gas is present in an amount sufficient to foam the cement slurries, generally in an amount in the range of from about 50% to about 80% by volume of the cement slurries.

By the present invention, improved single universal additives for foaming and stabilizing cement slurries containing fresh water or saltwater are provided. The foamed cement slurries of this invention formed with the additives are highly stable and produce foamed cement slurries which have high compressive strengths after setting at low concentrations of the additive as compared to prior art additives.

The cement slurry foaming and stabilizing additives of this invention are basically comprised of an ethoxylated alcohol ether sulfate surfactant of the formula $$H(CH_2)_a(OC_2H_4)_bOSO_3NH_4^+$$

wherein a is an integer in the range of from about 6 to about 10 and b is an integer in the range of from about 3 to about 10, an alkyl or alkene amidopropyl betaine surfactant having the formula $$R\text{—}CONHCH_2CH_2CH_2N^+(CH_3)_2CH_2CO_2^-$$

wherein R is a radical selected from the group of decyl, cocoyl, lauryl, cetyl and oleyl and an alkyl or alkene amidopropyl dimethyl amine oxide surfactant having the formula $$R\text{—}CONHCH_2CH_2CH_2N^+(CH_3)_2O^-$$

wherein R is a radical selected from the group of decyl, cocoyl, lauryl, cetyl and oleyl. The ethoxylated alcohol ether sulfate surfactant is generally present in an additive of this invention in an amount in the range of from about 60 to about 64 parts by weight. The alkyl or alkene amidopropyl betaine surfactant is generally present in the additive in an amount in the range of from about 30 to about 33 parts by weight and the alkyl or alkene amidopropyl dimethyl amine oxide surfactant is generally present in the additive in an amount in the range of from about 3 to about 10 parts by weight. The additive can be in the form of a mixture of the above described surfactants, but more preferably, the additive includes fresh water in an amount sufficient to dissolve the surfactants whereby it can more easily be combined with a cement slurry.

A particularly preferred additive of this invention is comprised of an ethoxylated alcohol ether sulfate surfactant wherein "a" in the formula thereof set forth above is an integer in the range of from 6 to 10 and the surfactant is present in the additive in an amount of about 63.3 parts by weight, the alkyl or alkene amidopropyl betaine surfactant is cocoyl-amidopropyl betaine and is present in the additive in an amount of about 31.7 parts by weight and the alkyl or alkene amidopropyl dimethyl amine oxide surfactant in the additive is cocoyl-amidopropyl dimethyl amine oxide and is present in an amount of about 5 parts by weight.

The foaming and stabilizing additive is generally included in a foamed cement slurry of this invention in an amount in the range of from about 1% to about 4% by volume of water in the cement slurry prior to being foamed.

In addition to water for dissolving the surfactants, the additive of this invention can include other components such as one or more freezing and pour point depressants to prevent it from freezing during storage or handling in cold weather and lower its pour point. Preferably, such depressants are selected from the group of ethylene glycol monobutyl ether, diethylene glycol, sodium chloride, isopropyl alcohol and mixtures thereof. The depressant or depressants utilized are generally present in the additive solution in an amount in the range of from about 10% to about 30% by weight of the solution.

The foamed cement slurries of this invention may be prepared in accordance with any of the mixing techniques utilized in the art. In one preferred method, a quantity of water is introduced into a cement blender followed by the hydraulic cement utilized. The mixture is agitated for a sufficient period of time to form a pumpable non-foamed slurry. The slurry is then pumped to the well bore, and the additive of this invention for foaming and stabilizing the slurry followed by the gas utilized are injected into the slurry on the fly. As the slurry and gas flow through the well bore to the location where the resulting foamed cement composition is to be placed, the slurry is foamed and stabilized. Other liquid additives utilized, if any, are added to the water prior to when the hydraulic cement is mixed therewith and other dry solids, if any, are added to the water and cement prior to mixing.

The methods of this invention of cementing a subterranean zone penetrated by a well bore basically comprise the steps of forming a foamed cement slurry of this invention, pumping the foamed cement slurry into the subterranean zone to be cemented by way of the well bore and then allowing the foamed cement slurry to set into a hard impermeable mass therein.

In order to further illustrate the improved cement slurries, additives and methods of this invention, the following examples are given.

EXAMPLE 1

Test samples of foamed cement slurries comprised of Portland Class G cement, fresh water or saltwater and air were prepared. For each test sample, an unformed cement slurry was first prepared utilizing a mixing device. Predetermined amounts of the resulting slurry were then placed in fixed volume blender jars adapted for receiving a stacked blade assembly. The additive of this invention for stabilizing and foaming a cement composition was added to some of the test samples and two prior art additives consisting of mixtures of foaming agents and foam stabilizers were added to the other samples.

The additive of this invention consisted of 63.3 parts by weight of an ethoxylated hexanol ether sulfate surfactant, 31.7 parts by weight of cocoyl-amidopropyl betaine surfactant and 5 parts by weight of cocoyl-amidopropyl dimethyl amine oxide surfactant. The first prior art additive designated as "Prior Art Mixture A" consisted of a mixture of 2 parts by weight of an alpha-olefin sulfonate surfactant and 1 part by weight of coco-amidopropyl betaine surfactant. The second prior art additive designated as "Prior Art Mixture B" consisted of a mixture of 2 parts by weight of an ethoxylated hexanol ether sulfate surfactant and 1 part by weight of cocoyl-amidopropyl betaine surfactant. After the addition of the additive of this invention and the prior art additives to the test samples in the jars, the contents were mixed at high speed. The high speed mixing by the stacked blade assembly caused each slurry to be foamed with air. The densities of the non-foamed cement slurries, the densities of the foamed cement slurries, the quantities of foaming and stabilizing additives combined with the cement slurries in order to obtain stable foams in 10 seconds or less and the quantities of salt (sodium chloride) added to the water used to form the cement slurries are set forth in Table I below.

The foamed test samples were allowed to set for 24 hours at 140° F. and atmospheric pressure after which they were subjected to compressive strength and thickening time tests conducted in accordance with the procedures set forth in the *API Specification* 10 mentioned above. The results of the tests are also set forth in Table I below.

TABLE I

Foamed Portland Cement Slurries Formed With Various Surfactant Mixtures

| Slurry No. | Surfactant Mixture Used | Unfoamed Cement Slurry Density, lb/gal | Foamed Cement Slurry Density, lb/gal | Quantity of Surfactant Mixture Used, % by vol. of water | Time Required to Form a Stable Foam, sec | Quantity of Sodium Chloride in Water, % by wt. of water | 24 Hour Compressive Strength at 140° F., psi | Thickening Time at 140° F., hr:min |
|---|---|---|---|---|---|---|---|---|
| 1 | Present Invention[1] | 15.8 | 11.2 | 2 | <10 | 0 | 1103 | 3:05 |
| 2 | Present Invention[1] | 15.95 | 11 | 2 | <10 | 5 | 900 | — |
| 3 | Present Invention[1] | 16.2 | 11 | 2 | 10 | 10 | 1220 | — |
| 4 | Present Invention[1] | 16.59 | 11.5 | 2 | 10 | 18 | 1013 | — |
| 5 | Present Invention[1] | 17.51 | 11.2 | 2 | 10 | 37 | 625 | 5:45 |
| 6 | Prior Art Mixture A[2] | 15.8 | 11.2 | 2.5 | 10 | 0 | 505 | 3:00 |
| 7 | Prior Art Mixture A[2] | 15.95 | 11 | 2.5 | 10 | 5 | 710 | — |
| 8 | Prior Art Mixture A[2] | 16.2 | 11 | 2.5 | 10 | 10 | 725 | — |
| 9 | Prior Art Mixture A[2] | 16.59 | 11.5 | 2.5 | 10 | 18 | 780 | 3:15 |

TABLE I-continued

Foamed Portland Cement Slurries Formed With Various Surfactant Mixtures

| Slurry No. | Surfactant Mixture Used | Unfoamed Cement Slurry Density, lb/gal | Foamed Cement Slurry Density, lb/gal | Quantity of Surfactant Mixture Used, % by vol. of water | Time Required to Form a Stable Foam, sec | Quantity of Sodium Chloride in Water, % by wt. of water | 24 Hour Compressive Strength at 140° F., psi | Thickening Time at 140° F., hr:min |
|---|---|---|---|---|---|---|---|---|
| 10 | Prior Art Mixture A[2] | 17.51 | 11.2 | 2.5 | 10 | 37 | 460 | — |
| 11 | Prior Art Mixture B[3] | 15.8 | 11.2 | 2.5 | 10 | 0 | 759 | 2:45 |
| 12 | Prior Art Mixture B[3] | 15.95 | 11 | 2.5 | 10 | 5 | 1328 | — |
| 13 | Prior Art Mixture B[3] | 16.2 | 11 | 2.5 | 10 | 10 | 1123 | 2:45 |
| 14 | Prior Art Mixture B[3] | 16.59 | 11.5 | 2.5 | 10 | 18 | 1081 | 3:30 |
| 15 | Prior Art Mixture B[3] | 17.51 | 11.2 | 2.5 | 10 | 37 | 581 | 6:15 |

[1] 19 parts by weight ethoxylated alcohol ether sulfate, 9.5 parts by weight cocoyl-amidopropyl betaine and 1.5 parts by weight cocyl-amidopropyl dimethyl amine oxide
[2] 2 parts by weight alpha-olefin sulfonate and 1 part by weight cocyl-amidopropyl betaine
[3] 2 parts by weight ethoxylated hexanol ether sulfate and 1 part by weight cocyl-amidopropyl betaine From Table I it can be seen that the surfactant mixture of the present invention produced stable foamed cement slurries in 10 seconds or less at lower concentrations than the concentrations of the prior art mixtures required to produce stable foamed cement slurries in 10 seconds. It is generally accepted that if a foaming and stabilizing additive requires more than 10 seconds in the laboratory to generate a stable foam, the additive is not acceptable in field operations. Further, the compressive strengths of the set foamed cement slurries utilizing the additive of the present invention were generally better than the compressive strengths of the set foamed cement slurries containing the prior art additives. Also, the presence of salt in the cement slurry mixing water does not affect the performance of the surfactant mixture of the present invention.

EXAMPLE 2

The procedure described in Example 1 was repeated except that instead of standard particle size Portland cement, an ultra-fine particle size Portland cement was utilized. The ultra-fine particle size cement which was used is commercially available from Halliburton Energy Services of Duncan, Okla. under the trade designation "MICRO MATRIX™" and it has an average particle size of about 7.5 microns. The results of these tests are given in Table II below.

TABLE II

Foamed Ultra-Fine Cement Slurries Formed With Various Surfactant Mixtures

| Slurry No. | Surfactant Mixture Used | Unfoamed Cement Slurry Density, lb/gal | Foamed Cement Slurry Density, lb/gal | Quantity of Surfactant Mixture Used, % by vol. of water | Time Required to Form a Stable Foam, sec | Quantity of Sodium Chloride in Water, % by wt. of water | 24 Hour Compressive Strength at 140° F., psi | Thickening Time at 140° F., hr:min |
|---|---|---|---|---|---|---|---|---|
| 16 | Present Invention[1] | 12.03 | 10 | 1 | <10 | 0 | 835 | 1:00 |
| 17 | Present Invention[1] | 12.26 | 10 | 1 | <10 | 5 | 830 | — |
| 18 | Present Invention[1] | 12.58 | 10 | 1 | 10 | 10 | 820 | — |
| 19 | Present Invention[1] | 13.09 | 10 | 1.5 | 10 | 18 | 720 | 0:50 |
| 20 | Preseut Invention[1] | 14.32 | 10 | 2.5 | 10 | 37 | 619 | — |
| 21 | Prior Art Mixture A[2] | 12.03 | 10 | 2.5 | 10 | 0 | 467 | 1:00 |
| 22 | Prior Art Mixture A[2] | 12.26 | 10 | 2.5 | 10 | 5 | 312 | — |
| 23 | Prior Art Mixture A[2] | 12.58 | 10 | 2.5 | 10 | 10 | 819 | — |
| 24 | Prior Art Mixture A[2] | 13.09 | 10 | 2.5 | 10 | 18 | 634 | — |
| 25 | Prior Art Mixture A[2] | 14.32 | 10 | 2.5 | 20 | 37 | 564 | 0.45 |
| 26 | Prior Art Mixture B[3] | 12.03 | 10 | 2.5 | 10 | 0 | 795 | 1:00 |
| 27 | Prior Art Mixture B[3] | 12.26 | 10 | 2.5 | 10 | 5 | 946 | — |
| 28 | Prior Art Mixture B[3] | 12.58 | 10 | 2.5 | 10 | 10 | 875 | 0:43 |
| 29 | Prior Art Mixture B[3] | 13.09 | 10 | 2.5 | 10 | 18 | 852 | — |
| 30 | Prior Art Mixture B[3] | 14.32 | 10 | 2.5 | 15 | 37 | 839 | 0:48 |

[1] 19 parts by weight ethoxylated alcohol ether sulfate, 9.5 parts by weight cocoyl-amidopropyl betaine and 1.5 parts by weight cocyl-amidopropyl dimethyl amine oxide
[2] 2 parts by weight alpha-olefin sulfonate and 1 part by weight cocyl-amidopropyl betaine
[3] 2 parts by weight ethoxylated hexanol ether sulfate and 1 part by weight cocyl-amidopropyl betaine From Table II it can be seen that the surfactant mixture of the present invention produced stable foamed cement slurries in 10 seconds or less at considerably lower concentrations than those required for the prior art surfactant mixtures. In addition, the presence of salt in the cement slurry mixing water does not affect the performance of the surfactant mixture of the present invention.

EXAMPLE 3

The tests and procedures described in Example 1 above were repeated except that slag cement was substituted for Portland cement. The results of these tests are set forth in Table III below.

TABLE III

Foamed Slag Cement Slurries Formed With Various Surfactant Mixtures

| Slurry No. | Surfactant Mixture Used | Unfoamed Cement Slurry Density, lb/gal | Foamed Cement Slurry Density, lb/gal | Quantity of Surfactant Mixture Used, % by vol. of water | Time Required to Form a Stable Foam, sec | Quantity of Sodium Chloride in Water, % by wt. of water | 24 Hour Compressive Strength at 140° F., psi | Thickening Time at 140° F., hr:min |
|---|---|---|---|---|---|---|---|---|
| 31 | Present Invention[1] | 15.03 | 12 | 2 | <10 | 0 | 2250 | 1:20 |
| 32 | Present Invention[1] | 15.18 | 12 | 2 | 10 | 5 | — | — |
| 33 | Present Invention[1] | 15.42 | 12 | 2 | 10 | 10 | — | — |
| 34 | Present Invention[1] | 15.80 | 12 | 2 | 10 | 18 | — | — |
| 35 | Present Invention[1] | 16.71 | 12 | 3.5 | 10 | 37 | 1588 | 0:40 |
| 36 | Prior Art Mixture A[2] | 15.03 | 12 | 3.5 | | would not foam | | |
| 37 | Prior Art Mixture A[2] | 15.18 | 12 | 3.5 | | would not foam | | |
| 38 | Prior Art Mixture A[2] | 15.42 | 12 | 3.5 | | would not foam | | |
| 39 | Prior Art Mixture A[2] | 15.80 | 12 | 3.5 | | would not foam | | |
| 40 | Prior Art Mixture A[2] | 16.71 | 12 | 3.5 | | would not foam | | |
| 41 | Prior Art Mixture B[3] | 15.03 | 12 | 3.5 | 10 | 0 | 1715 | 1:15 |
| 42 | Prior Art Mixture B[2] | 15.18 | 12 | 3.5 | 10 | 5 | 2340 | — |
| 43 | Prior Art Mixture B[2] | 15.42 | 12 | 3.5 | 10 | 10 | 1597 | — |
| 44 | Prior Art Mixture B[2] | 15.80 | 12 | 3.5 | 20 | 18 | 1692 | — |
| 45 | Prior Art Mixture B[2] | 16.71 | 12 | 3.5 | 30 | 37 | 1338 | 0:37 |

[1] 19 parts by weight ethoxylated alcohol ether sulfate, 9.5 parts by weight cocoyl-amidopropyl betaine and 1.5 parts by weight cocyl-amidopropyl dimethyl amine oxide
[2] 2 parts by weight alpha-olefin sulfonate and 1 part by weight cocyl-amidopropyl betaine
[3] 2 parts by weight ethoxylated hexanol ether sulfate and 1 part by weight cocyl-amidopropyl betaine From Table III it can again be seen that the surfactant mixture of the present invention produced stable foams in 10 seconds or less at considerably lower concentrations than did the prior art surfactant mixtures.

EXAMPLE 4

The tests and procedures described in Example 1 above were repeated except that the surfactant mixtures were added to a special low temperature cement slurry comprised of standard particle size Portland Class A cement mixed with the ultra-fine particle size Portland cement described in Example 2 above in an amount of 18% ultra-fine cement by weight of the cement mixture, calcium chloride in an amount of 2% by weight of the cement mixture, a dry cement free flow additive present in an amount of 0.055% by weight of the cement mixture and seawater in amounts sufficient to form cement slurries having the densities set forth in Table IV below. The results of the tests are also set forth in Table IV below.

TABLE IV

Foamed Low Temperature Cement Slurries With Various Surfactant Mixtures

| Slurry No. | Surfactant Mixture Used | Unfoamed Cement Slurry Density, lb/gal | Foamed Cement Slurry Density, lb/gal | Quantity of Surfactant Mixture Used, % by vol. of water | Time Required to Form a Stable Foam, sec | 24 Hr. Compressive Strength at 45° F., psi | Thickening Time at 65° F., hr:min |
|---|---|---|---|---|---|---|---|
| 46 | Prior Art Mixture B[3] | 15.17 | 12 | 2.25 | 10 | 348 | 4:03 |
| 47 | Prior Art Mixture A[2] | 15.17 | 12 | 1 | 10 | 345 | 2:45 |
| 48 | Present Invention[1] | 15.24 | 12 | 1 | <10 | 381 | 4:00 |

[1] 19 parts by weight ethoxylated alcohol ether sulfate, 9.5 parts by weight cocoyl-amidopropyl betaine and 1.5 parts by weight cocyl-amidopropyl dimethyl amine oxide
[2] 2 parts by weight alpha-olefin sulfonate and 1 part by weight cocyl-amidopropyl betaine
[3] 2 parts by weight ethoxylated hexanol ether sulfate and 1 part by weight cocyl-amidopropyl betaine From Table IV, it can again be seen that the surfactant mixture of the present invention produces stable foamed cement slurries at much lower concentrations than the concentrations required by the prior art surfactant mixtures.

EXAMPLE 5

A number of the foamed cement slurries formed in accordance with the procedure set forth in Example 1 were tested for rheological properties in accordance with the procedures set forth in the above mentioned *API Specification* 10. The results of these tests are set forth in Table V below.

TABLE V

Rheological Properties of Foamed Cement Slurries

| Slurry No. | Surfactant Mixture Used | Viscosity at Room Temperature, cp | | | | | |
|---|---|---|---|---|---|---|---|
| | | 600 rpm | 300 rpm | 200 rpm | 100 rpm | 6 rpm | 3 rpm |
| 1 | Present Invention[1] | 118 | 75 | 63 | 50 | 21 | 14 |
| 3 | Present Invention[1] | 90 | 54 | 42 | 35 | 18 | 1s |
| 8 | PriorArt Mixture A[2] | 78 | 48 | 36 | 26 | 13 | 12 |
| 10 | Prior Art Mixture A[2] | 78 | 50 | 42 | 32 | 17 | 14 |
| 11 | Prior Art Mixture B[3] | 150 | 88 | 80 | 68 | 24 | 18 |
| 16 | Present Invention[1] | 68 | 54 | 48 | 40 | 24 | 20 |
| 18 | Present Invention[1] | 75 | 56 | 51 | 40 | 25 | 21 |
| 23 | Prior Art Mixture A[2] | 76 | 44 | 35 | 26 | 14 | 12 |
| 28 | Prior Art Mixture B[3] | 79 | 53 | 42 | 35 | 20 | 16 |
| 33 | Present Invention[1] | 69 | 54 | 47 | 38 | 24 | 20 |
| 43 | Prior Art Mixture B[3] | 68 | 55 | 49 | 40 | 25 | 22 |

[1] 19 parts by weight ethoxylated alcohol ether sulfate, 9.5 parts by weight cocoyl-amidopropyl betaine and 1.5 parts by weight cocyl-amidopropyl dimethyl amine oxide
[2] 2 parts by weight alpha-olefin sulfonate and 1 part by weight cocyl-amidopropyl betaine
[3] 2 parts by weight ethoxylated hexanol ether sulfate and 1 part by weight cocyl-amidopropyl betaine From Table V, it can be seen that the foamed cement slurries containing the surfactant mixture of the present invention have low apparent viscosities which indicates that the placement of such foamed cement slurries in subterranean formations will not result in formation breakdown due to high pumping pressures exerted thereon.

EXAMPLE 6

Portland Class G cement slurries formed with fresh water and having densities of 15.9 pounds per gallon were foamed to densities of 11 pounds per gallon using the surfactant mixture of the present invention, the surfactant mixture designated as Prior Art Mixture A and the surfactant mixture designated as Prior Art Mixture B in Example 1 above. The foam slurries were cured at 140° F. for 72 hours. Thereafter, the three set foamed cement slurries were photographed using a Scanning Electron Microscope at a magnification of 60×. The photograph of the set foamed cement slurry containing the surfactant mixture of the present invention is shown in FIG. 1. The set foamed cement slurry containing the surfactant mixture identified as Prior Art Mixture A is shown in FIG. 2. The set foamed cement slurry containing the surfactant mixture identified as Prior Art Mixture B is shown in FIG. 3.

It is known that unstable foamed cement slurries result in a pore structure which is non-spherical and interconnected. This phenomenon occurs while the cement sets and it is caused by the rupture of unstable gas bubbles which results in a coalescence and the formation of larger gas pockets. Such unstable foam cement slurries set into spongy masses with lower compressive strengths, higher permeabilities and inferior bonding properties. Stable foam cement slurries have spherical, discreet and disconnected pore structures in a well defined cement matrix. The stable foams also have uniform bubble sides.

An examination of FIGS. 1–3 shows that the set foamed cement slurry containing the surfactant mixture of the present invention (FIG. 1) has nearly spherical bubbles separated by rather thick films indicating that the foamed cement slurry was stable. This is compared with the set foamed cement slurries containing the surfactant mixtures designated as Prior Art Mixture A and Prior Art Mixture B shown in FIGS. 2 and 3, respectively, which have interconnected non-spherical pore structures indicating that the foamed cement slurries were unstable.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A foamed cement slurry for cementing a well comprising:

a hydraulic cement;

sufficient water to form a pumpable slurry;

sufficient gas to form a foam; and an effective amount of an additive for foaming and stabilizing said slurry comprised of an ethoxylated alcohol ether sulfate surfactant of the formula

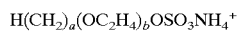

$$H(CH_2)_a(OC_2H_4)_bOSO_3NH_4^+$$

wherein a is an integer in the range of from about 6 to about 10 and b is an integer in the range of from about 3 to about 10 and said ethoxylated alcohol ether sulfate surfactant is present in said additive in an amount in the range of from about 60 to about 64 parts by weight, an alkyl or alkene amidopropyl betaine surfactant having the formula

$$R-CONHCH_2CH_2CH_2N^+(CH_3)_2CH_2CO_2^-$$

wherein R is a radical selected from the group of decyl, cocoyl, lauryl, cetyl and oleyl and said alkyl or alkene amidopropyl betaine surfactant is present in said additive in an amount in the range of from about 30 to about 33 parts by weight and an alkyl or alkene amidopropyl dimethyl amine oxide surfactant having the formula $$R\text{—}CONHCH_2CH_2CH_2N^+(CH_3)_2O^-$$

wherein R is a radical selected from the group of decyl, cocoyl, lauryl, cetyl and oleyl and said alkyl or alkene amidopropyl dimethyl amine oxide surfactant is present in said additive in an amount in the range of from about 3 to about 10 parts by weight.

2. The foamed cement slurry of claim 1 wherein said hydraulic cement is selected from the group of Portland cements, slag cements, pozzolana cements, gypsum cements, high alumina content cements, silica cements and high alkalinity cements.

3. The foamed cement slurry of claim 1 wherein said water is selected from the group of fresh water, unsaturated aqueous salt solutions and saturated aqueous salt solutions.

4. The foamed cement slurry of claim 1 wherein said water is present in an amount in the range of from about 38% to about 56% by weight of hydraulic cement therein.

5. The foamed cement slurry of claim 1 wherein said gas is selected from the group of air and nitrogen.

6. The foamed cement slurry of claim 1 wherein said gas is present in an amount in the range of from about 50% to about 80% by volume of said cement slurry.

7. The foamed cement slurry of claim 1 wherein "a" in said formula of said ethoxylated alcohol ether sulfate surfactant in said additive is an integer in the range of from 6 to 8 and said ethoxylated alcohol ether sulfate surfactant is present in said additive in an amount of about 63.3 parts by weight.

8. The foamed cement slurry of claim 1 wherein "R" in said formula of said alkyl or alkene amidopropyl betaine surfactant in said additive is cocoyl and said alkyl or alkene amidopropyl betaine surfactant is present in said additive in an amount of about 31.7 parts by weight.

9. The foamed cement slurry of claim 1 wherein "R" in said formula of said alkyl or alkene amidopropyl dimethyl amine oxide surfactant in said additive is cocoyl and said alkyl or alkene amidopropyl dimethyl amine oxide surfactant is present in said additive in an amount of about 5 parts by weight.

10. The foamed cement slurry of claim 1 wherein said additive is present in said foamed cement slurry in an amount in the range of from about 1% to about 4% by volume of said water in said foamed cement slurry.

11. An additive for foaming and stabilizing a cement slurry containing fresh water or salt water comprising:

an ethoxylated alcohol ether sulfate surfactant of the formula $$H(CH_2)_a(OC_2H_4)_bOSO_3NH_4^+$$

wherein a is an integer in the range of from about 6 to about 10 and b is an integer in the range of from about 3 to about 10 and said ethoxylated alcohol ether sulfate surfactant is present in said additive in an amount in the range of from about 60 to about 64 parts by weight;

an alkyl or alkene amidopropyl betaine surfactant having the formula $$R\text{—}CONHCH_2CH_2CH_2N^+(CH_3)_2CH_2CO_2^-$$

wherein R is a radical selected from the group of decyl, cocoyl, lauryl, cetyl and oleyl and said alkyl or alkene amidopropyl betaine surfactant is present in said additive in an amount in the range of from about 30 to about 33 parts by weight; and an alkyl or alkene amidopropyl dimethyl amine oxide surfactant having the formula $$R\text{—}CONHCH_2CH_2CH_2N^+(CH_3)_2O^-$$

wherein R is a radical selected from the group of decyl, cocoyl, lauryl, cetyl and oleyl and said alkyl or alkene amidopropyl dimethyl amine oxide surfactant is present in said additive in an amount in the range of from about 3 to about 10 parts by weight.

12. The additive of claim 11 wherein "a" in said formula of said ethoxylated alcohol ether sulfate surfactant is an integer in the range of from 6 to 8 and said ethoxylated alcohol ether sulfate surfactant is present in said additive in an amount of about 63.3 parts by weight.

13. The additive of claim 11 wherein "R" in said formula of said alkyl or alkene amidopropyl betaine surfactant is cocoyl and said alkyl or alkene amidopropyl betaine surfactant is present in said additive in an amount of about 31.7 parts by weight.

14. The additive of claim 11 wherein "R" in said formula of said alkyl or alkene amidopropyl dimethyl amine oxide surfactant is cocoyl and said alkyl or alkene amidopropyl dimethyl amine oxide surfactant is present in said additive in an amount of about 5 parts by weight.

15. The additive of claim 11 which further comprises water present in an amount sufficient to dissolve said surfactants.

16. A method of cementing a subterranean zone penetrated by a well bore comprising the steps of:

(a) forming a foamed cement slurry comprised of hydraulic cement, sufficient water to form a pumpable slurry, sufficient gas to form a foam and an effective amount of an additive for foaming and stabilizing said slurry comprised of an ethoxylated alcohol ether sulfate surfactant of the formula $$H(CH_2)_a(OC_2H_4)_bOSO_3NH_4^+$$

wherein a is an integer in the range of from about 6 to about 10 and b is an integer in the range of from about 3 to about 10 and said ethoxylated alcohol ether sulfate surfactant is present in said additive in an amount in the range of from about 60 to about 64 parts by weight, an alkyl or alkene amidopropyl betaine surfactant having the formula $$R\text{—}CONHCH_2CH_2CH_2N^+(CH_3)_2CH_2CO_2^-$$

wherein R is a radical selected from the group of decyl, cocoyl, lauryl, cetyl and oleyl and said alkyl or alkene amidopropyl betaine surfactant is present in said additive in an amount in the range of from about 30 to about 33 parts by weight and an alkyl or alkene amidopropyl dimethyl amine oxide surfactant having the formula $$R\text{—}CONHCH_2CH_2CH_2N^+(CH_3)_2O^-$$

wherein R is a radical selected from the group of decyl, cocoyl, lauryl, cetyl and oleyl and said alkyl or alkene amidopropyl dimethyl amine oxide surfactant is present in said additive in an amount in the range of from about 3 to about 10 parts by weight;

(b) placing said foamed cement slurry into said subterranean zone by way of said well bore; and (c) allowing said foamed cement slurry to set into a hard impermeable mass.

17. The method of claim 16 wherein said hydraulic cement is selected from the group of Portland cements, slag cements, pozzolana cements, gypsum cements, high alumina content cements, silica cements and high alkalinity cements.

18. The method of claim 16 wherein said water is selected from the group of fresh water, unsaturated aqueous salt solutions and saturated aqueous salt solutions.

19. The method of claim 16 wherein said water is present in said foamed cement slurry in an amount in the range of from about 38% to about 56% by weight of hydraulic cement therein.

20. The method of claim 16 wherein said gas is selected from the group of air and nitrogen.

21. The method of claim 16 wherein said gas is present in said foamed cement slurry in an amount in the range of from about 50% to about 80% by volume of said cement slurry.

22. The method of claim 16 wherein "a" in said formula of said ethoxylated alcohol ether sulfate surfactant in said additive is an integer in the range of from 6 to 8 and said ethoxylated alcohol ether sulfate surfactant is present in said additive in an amount of about 63.3 parts by weight.

23. The method of claim 16 wherein "R" in said formula of said alkyl or alkene amidopropyl betaine surfactant in said additive is cocoyl and said alkyl or alkene amidopropyl betaine surfactant is present in said additive in an amount of about 31.7 parts by weight.

24. The method of claim 16 wherein "R" in said formula of said alkyl or alkene amidopropyl dimethyl amine oxide surfactant in said additive is cocoyl and said alkyl or alkene amidopropyl dimethyl amine oxide surfactant is present in said additive in an amount of about 5 parts by weight.

25. The method of claim 16 wherein said additive is present in said foamed cement slurry in an amount in the range of from about 1% to about 4% by volume of said water in said foamed cement slurry.

* * * * *